United States Patent
Channabasavaiah et al.

(10) Patent No.: US 8,744,887 B2
(45) Date of Patent: Jun. 3, 2014

(54) SERVICE ORIENTED ARCHITECTURE LIFECYCLE ORGANIZATION CHANGE MANAGEMENT

(75) Inventors: Kishore Channabasavaiah, Palatine, IL (US); Benjamin S. Gerber, Ann Arbor, MI (US); Sri Ramanathan, Lutz, FL (US); Siljan H. Simpson, Irving, TX (US); Matthew B. Trevathan, Kennesaw, GA (US); Raghu Varadan, San Francisco, CA (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 12/398,572

(22) Filed: Mar. 5, 2009

(65) Prior Publication Data

US 2010/0228587 A1 Sep. 9, 2010

(51) Int. Cl.
*G06Q 10/00* (2012.01)

(52) U.S. Cl.
USPC .......................... 705/7.12; 705/7.23

(58) Field of Classification Search
CPC ............................... G06Q 10/06375
USPC ............................... 705/7.11–7.42
See application file for complete search history.

(56) References Cited

U.S. PATENT DOCUMENTS

| | | | |
|---|---|---|---|
| 7,315,853 B2 | 1/2008 | Brunswig et al. | |
| 7,483,973 B2 | 1/2009 | An et al. | |
| 7,957,994 B2 * | 6/2011 | Brown et al. | 705/7.11 |
| 8,200,526 B2 * | 6/2012 | McHale | 705/7.32 |
| 2005/0197873 A1 * | 9/2005 | Little | 705/7 |
| 2006/0235733 A1 * | 10/2006 | Marks | 705/7 |
| 2007/0022404 A1 * | 1/2007 | Zhang et al. | 717/103 |
| 2007/0033194 A1 * | 2/2007 | Srinivas et al. | 707/10 |
| 2007/0043724 A1 * | 2/2007 | Senan et al. | 707/8 |
| 2008/0066048 A1 * | 3/2008 | Hafermann et al. | 717/100 |
| 2008/0127047 A1 | 5/2008 | Zhang et al. | |
| 2008/0270153 A1 | 10/2008 | Drapkin et al. | |
| 2008/0270205 A1 * | 10/2008 | Kumar et al. | 705/7 |
| 2008/0282219 A1 | 11/2008 | Seetharaman et al. | |
| 2008/0300933 A1 * | 12/2008 | Britton et al. | 705/7 |
| 2009/0006147 A1 | 1/2009 | Padmanabhan | |
| 2009/0210853 A1 * | 8/2009 | Kumar et al. | 717/101 |
| 2010/0110933 A1 * | 5/2010 | Wilcock et al. | 370/255 |
| 2010/0125618 A1 * | 5/2010 | Dutta et al. | 707/822 |

OTHER PUBLICATIONS

McBride et al. "Delivering SOA solutions: service lifecycle management" (Dec. 2007) IBM.*

(Continued)

*Primary Examiner* — Sujay Koneru
(74) *Attorney, Agent, or Firm* — Matthew Chung; Keohane & D'Alessandro, PLLC (57) ABSTRACT

An approach that manages a service oriented architecture (SOA) lifecycle organization change is provided. In one embodiment, there is a change management tool, including a retrieval component configured to retrieve a proposed change; a lifecycle defining component configured to define an SOA lifecycle based on the proposed change; a services portfolio component configured to identify a plurality of SOA shared services in services portfolio that addresses the proposed change; a stakeholder component configured to identify stakeholders having an interest in the proposed change; an impact component configured to determine impacts of the proposed change on the stakeholders; a deployment planning component configured to develop a service deployment plan and communication plan related to the proposed change; and an implementation component configured to implement the plurality of SOA shared services that addresses the proposed change.

16 Claims, 4 Drawing Sheets

(56) References Cited

OTHER PUBLICATIONS

Schepers et al. "A lifecycle approach to SOA governance" (2008) SAC '08 Proceedings of the 2008 ACM symposium on Applied computing.*

"A new service-oriented architecture (SOA) maturity model" (2005) Sonic Software Corporation et al.*

"Building SOA Solutions and Managing the Service Lifecycle" (2007) IBM.*

"Mercury's Systinent Division Unveils Policy Manager 2.0" (2006) Business Wire.*

Bloomberg "Business Infrastructure Software in Action" (Feb. 2008) Zapthink.*

* cited by examiner

SERVICE ORIENTED ARCHITECTURE LIFECYCLE ORGANIZATION CHANGE MANAGEMENT

FIELD OF THE INVENTION

This invention relates generally to a change management process and more specifically to a Service Oriented Architecture (hereinafter SOA) lifecycle organization change management framework.

BACKGROUND OF THE INVENTION

An important factor in the success of a business is its ability to react to organizational changes within the business. These changes are usually handled through a change management process. Typically, the concept of organizational change is in regard to organization-wide change, as opposed to smaller changes such as adding a new person or modifying a program. However, today's change management systems do not cover Service Oriented Architecture (SOA) and are focused on singular programs. As organizations adopt SOA, there is a need to define and put in place an organizational change management process.

In an SOA environment, there is a need to mitigate risk with appropriate oversight and control between the different parties involved due to higher levels of collaboration and resource sharing. In SOA, there is a need to increase reuse and buy-in for shared services. Therefore, the change management process needs to ensure that the SOA governance capabilities addressing shared services are spanning across multiple groups within the enterprise and are accepted by all the groups. This acceptance will allow the organization to realize greater benefits from their SOA deployment and adoption. Current change management systems are "static" in that they are focused on the initial creation and deployment of a change within the enterprise. Furthermore, current change management systems do not provide any lifecycle management processes to manage the change once it's been deployed.

SUMMARY OF THE INVENTION

In one embodiment, there is a method for managing an SOA lifecycle organization change process. In this embodiment, the method comprises: retrieving a proposed change; defining an SOA lifecycle based on the proposed change; identifying a plurality of SOA shared services in services portfolio that addresses the proposed change; identifying stakeholders having an interest in the proposed change; determining impacts of the proposed change on the stakeholders; developing a service deployment plan and communication plan related to the proposed change; and implementing the plurality of SOA shared services that addresses the proposed change.

In a second embodiment, there is a system for managing an SOA lifecycle organization change process. In this embodiment, the system comprises at least one processing unit, and memory operably associated with the at least one processing unit. A change management tool is storable in memory and executable by the at least one processing unit. The change management tool comprises: a retrieval component configured to retrieve a proposed change; a lifecycle defining component configured to define an SOA lifecycle based on the proposed change; a services portfolio component configured to identify a plurality of SOA shared services in services portfolio that addresses the proposed change; a stakeholder component configured to identify stakeholders having an interest in the proposed change; an impact component configured to determine impacts of the proposed change on the stakeholders; a deployment planning component configured to develop a service deployment plan and communication plan related to the proposed change; and an implementation component configured to implement the plurality of SOA shared services that addresses the proposed change.

In a third embodiment, there is a computer-readable medium storing computer instructions, which when executed, enables a computer system to manage an SOA lifecycle organization change process, the computer instructions comprising: retrieving a proposed change; defining an SOA lifecycle based on the proposed change; identifying a plurality of SOA shared services in services portfolio that addresses the proposed change; identifying stakeholders having an interest in the proposed change; determining impacts of the proposed change on the stakeholders; developing a service deployment plan and communication plan related to the proposed change; and implementing the plurality of SOA shared services that addresses the proposed change.

In a fourth embodiment, there is a method for deploying a change management tool for use in a computer system that manages an SOA lifecycle organization change process. In this embodiment, a computer infrastructure is provided and is operable to: retrieve a proposed change; define an SOA lifecycle based on the proposed change; identify a plurality of SOA shared services in services portfolio that addresses the proposed change; identify stakeholders having an interest in the proposed change; determine impacts of the proposed change on the stakeholders; develop a service deployment plan and communication plan related to the proposed change; and implement the plurality of SOA shared services that addresses the proposed change.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to a method for managing an SOA lifecycle organization change process. In these embodiments, a change management tool provides this capability. Specifically, the change management tool provides a change management framework that is based on an enterprise services portfolio, an SOA shared services lifecycle management process, and involves stakeholders from across the enterprise. The change management tool retrieves a proposed change, defines a SOA lifecycle, reviews existing or establishes a new service portfolio, identifies cross-domain stakeholders, determines impacts on the stakeholders, develops service deployment and communication plan, implements services and service management processes, and manages services throughout the lifecycle.

Figure 1:
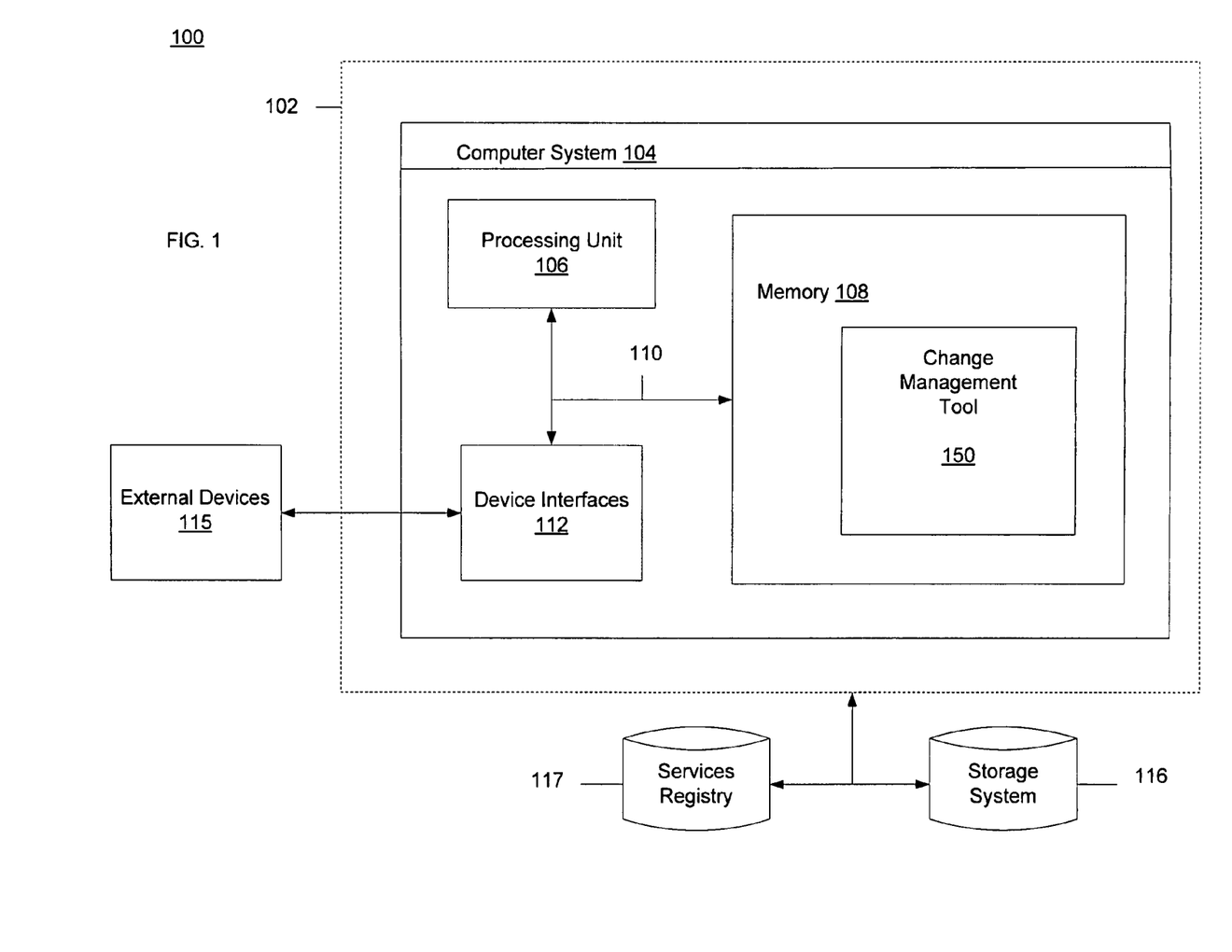
FIG. 1 shows a schematic of an exemplary computing environment in which elements of the present invention may operate.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for managing an SOA lifecycle organization change process. It should be understood that any other computers implemented under the present invention may have different components/software, but will perform similar functions. As shown, computer system 104 includes a processing unit 106, memory 108 for storing a change management tool 150, a bus 110, and device interfaces 112.

Processing unit 106 collects and routes signals representing outputs from external devices 115 (e.g., a keyboard, a pointing device, a display, a graphical user interface, etc.) to change management tool 150. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating change management tool 150, which is stored in memory 108 and/or storage system 116. While executing computer program code, processing unit 106 can read and/or write data to/from memory 108, storage system 116, and a services registry 117. Services registry 117 stores a plurality of SOA shared services and associated metadata, as well as rules against which the metadata is compared to locate shared services. Storage system 116 and services registry 117 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104.

Figure 2:
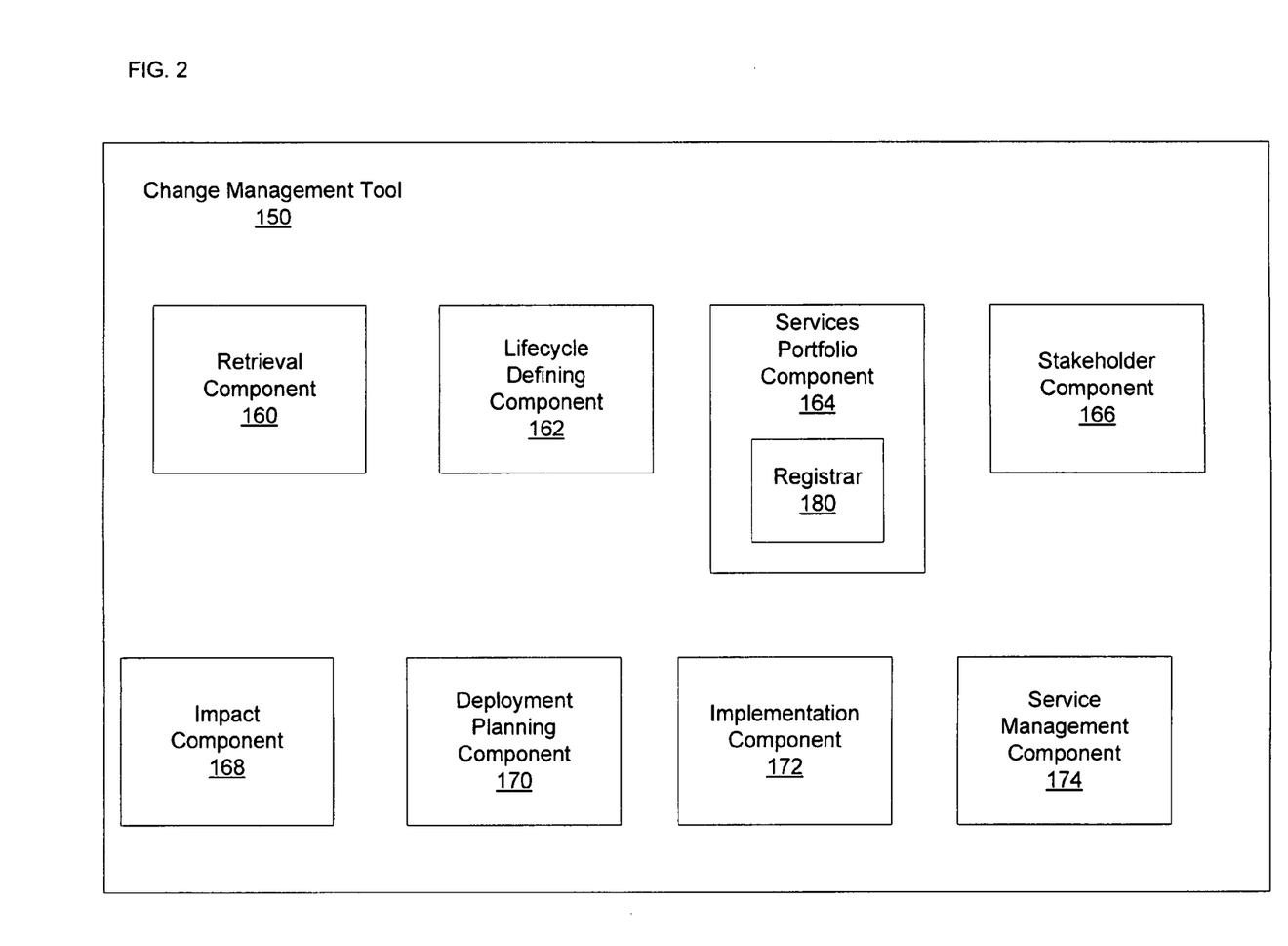
FIG. 2 shows a change management tool that operates in the environment shown in FIG. 1.

FIG. 2 shows a more detailed view of change management tool 150, which manages an SOA lifecycle organization change process. As shown, change management tool 150 comprises a retrieval component 160 configured to retrieve a proposed organization change. The organization change may be identified automatically by retrieval component 160, or provided as input by a user. An organization change is an organization-wide change, as opposed to smaller changes such as adding a new person or modifying a program. Examples of organization changes might include, but are not limited to, a change in mission, restructuring operations, implementing new technologies, mergers, and major collaborations.

Once an organization change is identified, an SOA lifecycle is established, which provides SOA development, governance and management processes for services throughout their lifecycle and includes cross-domain entities. Implementation 100 and change management tool 150 utilize an SOA services lifecycle management process (SLMP) 180, shown in FIG. 3, to manage the changes from inception to deployment to retirement. SLMP 180 identifies, implements, and manages an SOA shared service. SOA SMLP 180 provides guidance for managing the creation of shared services within an enterprise.

Figure 3:
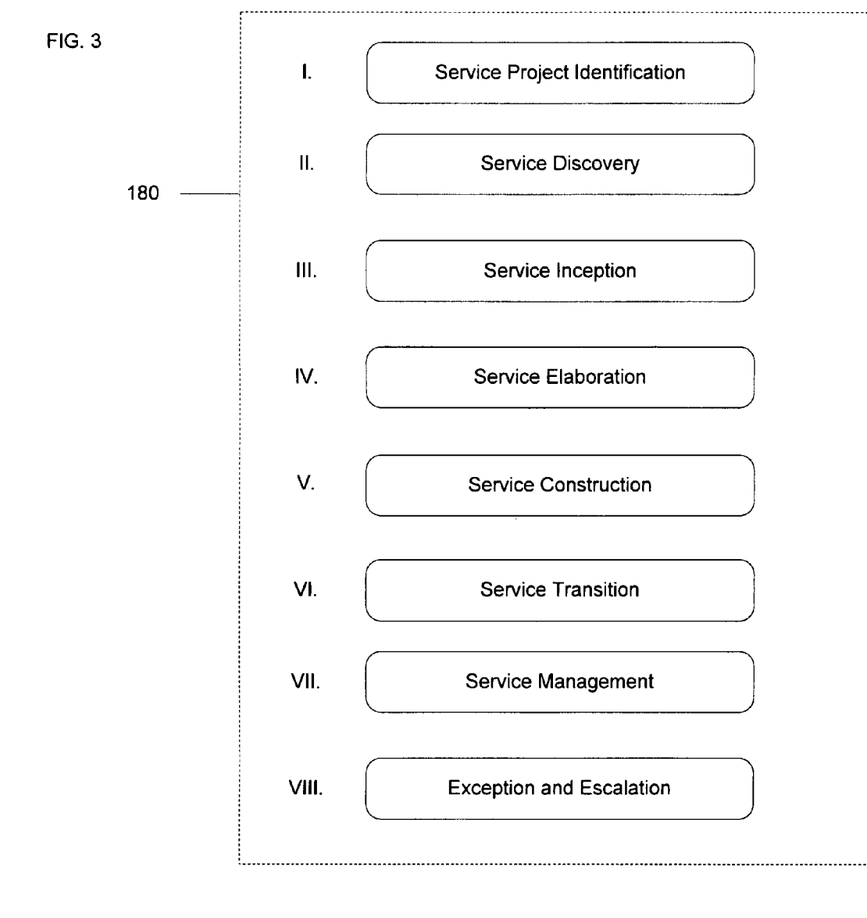
FIG. 3 shows a flow diagram of a SOA services lifecycle management process.

SOA SLMP 180 consists of the following distinct processes and associated methodologies:

I. New Service Opportunity Identification—the goal of this phase is to identify and evaluate a business need, and determine if the business need can be met through the use of SOA shared services.

II. Service Discovery—the goal of this phase is to complete the Discovery phase for a project that has been identified as a potential SOA services candidate project.

III. Service Inception—the goal of this phase is to gather the high level requirements for the SOA shared services that will be developed as part of the potential SOA services candidate project.

IV. Service Elaboration—the goal of this phase is to further define the high level requirements from the service inception phase into detailed requirements to complete the service solution design and prepare for the build phase.

V. Service Construction—the goal of this phase is to develop the integration components and integrate the SOA shared services components per the design guidelines while meeting/exceeding the necessary quality requirements so that the services can be deployed for general use.

VI. Service Transition—the goal of this phase is to transition the SOA shared services developed in the Construction phase to the operations team that will be responsible for ongoing SOA shared service maintenance.

VII. Manage Services—the goal of this phase is to manage the SOA shared services once they have been transitioned to the operations team that will be responsible for ongoing SOA shared service maintenance.

VIII. Exception and Escalation—the goal of this phase is resolve issues that occur during the SOA services lifecycle process in an expedient manner.

Each of the above processes is a complete methodology that can be implemented independently since they define key stakeholders, affected processes, ownership, and touchpoints throughout the organization. It will be appreciated that each of the above listed SOA processes are non-limiting examples of the functionality and operation of possible implementations of systems, methods and computer program products according to various embodiments of the present invention. In this regard, each process (I-VIII) may represent a module, segment, or portion of code, which comprises one or more executable instructions for implementing the specified logical function(s) of SOA SLMP 180, as shown in FIG. 3. It should also be noted that, in some alternative implementations, the functions noted in SOA SLMP 180 may occur out of the order listed above in processes I-VIII. For example, two processes shown in FIG. 3 in succession may, in fact, be executed substantially concurrently. It should also be noted that, in another alternative embodiment, additional or fewer process steps may be included in SOA SLMP 180. Further, each process of the flowchart of FIG. 3 can be implemented by special purpose hardware-based systems that perform the specified functions or acts.

Once the SOA lifecycle is defined by lifecycle defining component, services portfolio component 164 reviews services assets that are currently part of the enterprise services portfolio to determine whether required services already exists, whether existing services can be modified, or whether new services need to be created. Specifically, services portfolio component 164 is configured to search the services registry 117 (FIG. 1) to identify at least one SOA shared service that can be re-used to address the organization change retrieved by retrieval component 160. Services registry 117 functions like a computerized portfolio or reference book containing information on available services. Registrar 180 provides the algorithm(s) necessary for searching metadata, which describes the characteristics of each service, as well as the data that drives them. Registrar 180 is configured to enable a flexible query to the services registry 117 based on the identified organization change. The framework of the present invention seeks to utilize the established enterprise services portfolio in order to increase reuse of existing services, avoid duplicate development efforts, and make available across the enterprise any new services that are created. In the absence of an established enterprise services portfolio, a new services portfolio is created.

Once the services portfolio is reviewed, cross-domain stakeholders affected by the proposed change are identified. In traditional applications, the focus is on a single business unit owning that particular application or system and did not involve multiple stakeholders. Within SOA, there is a need to have existing and future stakeholders understand, accept, and be committed to leveraging the shared services. As shown in FIG. 2, identification tool 150 comprises a stakeholder component 166 configured to identify the affected SOA services stakeholders across the enterprise. Stakeholders may be identified automatically by stakeholder component 166, or provided as input by a user. These stakeholders may include decision makers, entities who need to be collaborated for making the change to SOA and stakeholders identified as the stewards or the evangelists for SOA adoption of SOA across the enterprise.

Once the stakeholders are identified, the next step is to determine the impact on the stakeholders related to the proposed organization change. As shown in FIG. 2, identification tool 150 comprises an impact component 168 configured to determine the impacts of deploying SOA to existing processes and the planned services as evolving in the enterprise services portfolio. Furthermore, impact component 168 is configured to determine the SOA governance impacts in the areas of SOA services ownership and funding.

Once the impacts on the stakeholders are identified, a service deployment and communication plan is developed. As shown in FIG. 2, identification tool 150 comprises a deployment-planning component 170 configured to establish a service state model for the model that identifies the transition points of the services and define a deployment plan for SOA. The deployment plan focuses on both the realization of SOA based in the enterprise SOA Vision and also the planned portfolio of services. Based on the deployment plan, a communication plan is developed and integrated into both the established SOA lifecycle management processes and the corresponding group of cross-domain stakeholders.

Once the service deployment and communication plan is developed, services and service management processes are implemented. As shown in FIG. 2, identification tool 150 comprises an implementation tool 172 that gains consensus as defined in the SOA lifecycle management and stakeholder management processes. Furthermore, implementation plan 172 deploys the service management infrastructure and executes the communication plan.

Once the services and service management processes are implemented, the remaining step is to manage services throughout the lifecycle. Current change management systems are "static", meaning they are focused on the initial creation and deployment of a change within the enterprise. Current change management systems do not provide any lifecycle management processes to manage the change once it has been deployed. The SOA lifecycle management process of the present invention manages the organization change from inception to deployment to retirement. As shown in FIG. 2, identification tool 150 comprises a services management component 174 that deploys and monitors the SOA infrastructure (i.e., the shared services that form the SOA), and executes the SOA organizational governance processes. As new services evolve and existing services transition through their defined states, services management component 174 monitors and manages the change across the organization.

Figure 4:
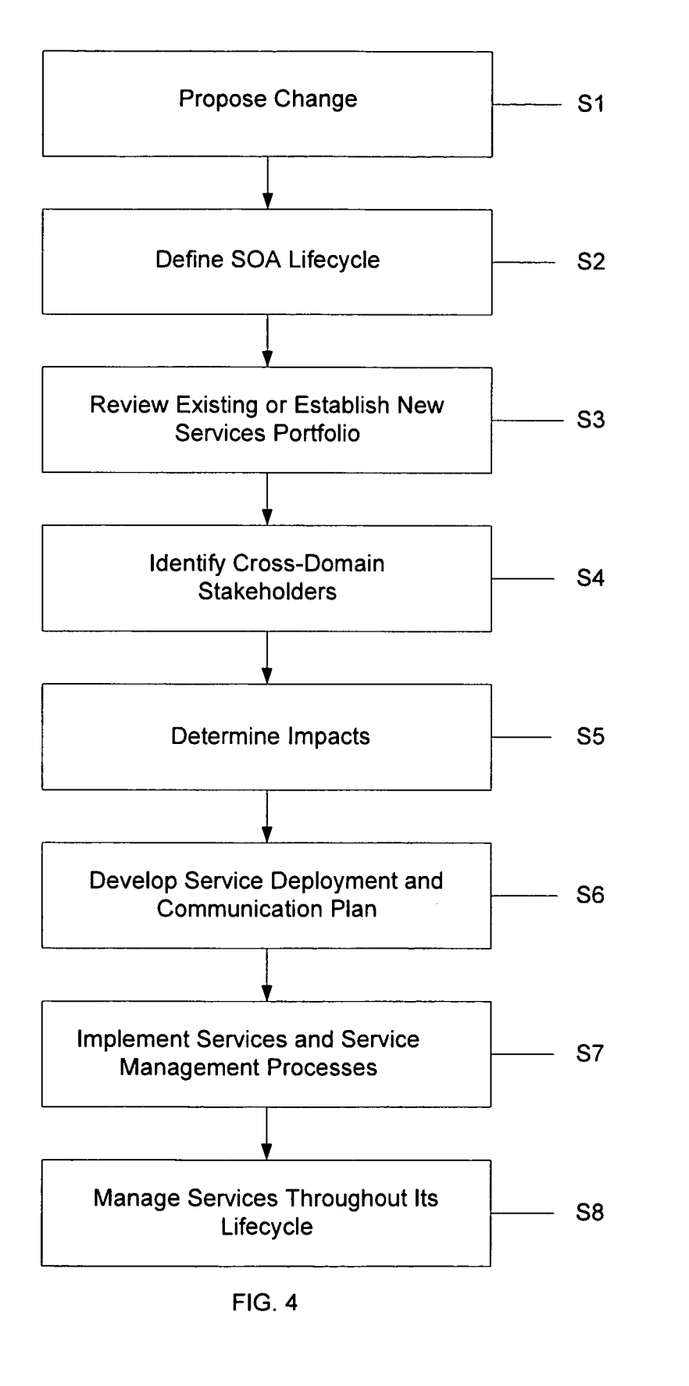
FIG. 4 shows a flow diagram of a SOA lifecycle organization change management process.

Referring now to FIG. 4, a change management flow for managing a SOA lifecycle organization change will be described in further detail. As shown, in step S1, an organization change is proposed. In S2, an SOA lifecycle is defined based on the proposed organization change. In S3, the services portfolio is searched and an existing service is utilized. If no service portfolio exists, a new services portfolio is established. In S4, the cross-domain stakeholders are identified. In S5, the impacts of deployment are determined. In S6, a service deployment and communication plan is developed. In S7, services and service management processes are implemented. In S8, services are managed throughout the lifecycle.

It will be appreciated that the change management process flow of FIG. 4 represents one possible implementation of a process flow for managing an SOA lifecycle organization change, and that other process flows are possible within the scope of the invention. FIG. 4 illustrates the architecture, functionality, and operation of possible implementations of systems, methods and computer program products according to various embodiments of the present invention. In this regard, each portion of the flowchart may represent a module, segment, or portion of code, which comprises one or more executable instructions for implementing the specified logical function(s). It will also be noted that each block of the flowchart illustration can be implemented by special purpose hardware-based systems that perform the specified functions or acts.

Further, it can be appreciated that the methodologies disclosed herein can be used within a computer system to manage an SOA lifecycle organization change, as shown in FIG. 1. In this case, change management tool 150 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Furthermore, an implementation of exemplary computer system 104 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data. Communication media also includes any information delivery media.

By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for identifying a SOA shared services project. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for managing a service oriented architecture (SOA) lifecycle organization change process comprising:
    retrieving a proposed organization-wide change stored in a computer memory; defining an SOA lifecycle to provide development, governance and management processes based on the proposed change;
    identifying, when available, a reusable plurality of SOA shared services in a services portfolio registry that address the proposed change, the identifying including searching a services registry to identify at least one SOA shared service that addresses the proposed change;
    identifying all affected stakeholders having a responsibility in the proposed change by identifying each of the following: each stakeholder having a responsibility in implementing the proposed change across the organization, each affected stakeholder having a responsibility in managing the proposed change across the organization, and each stakeholder having a responsibility in carrying out the proposed change across the organization;
    determining impacts of the proposed change on the affected stakeholders;
    developing, by a computing device, a service deployment plan and communication plan related to the proposed change;
    implementing the plurality of SOA shared services, the service deployment plan, and the communication plan that addresses the proposed change;
    deploying the plurality of SOA shared services to implement the proposed change; and
    managing the proposed change after deployment of the plurality of SOA shared services by maintaining the deployed proposed change across the organization during a transition through a lifecycle for each of the deployed plurality of SOA shared services implementing the proposed change and as new SOA services are introduced after the proposed change is deployed.

2. The computer-implemented method according to claim 1 further comprising:
    developing a plurality of service management processes related to the plurality of SOA shared services, wherein each of the plurality of SOA shared services is managed throughout the lifecycle of the plurality of SOA shared services based on the plurality of service management processes.

3. The computer-implemented method according to claim 1 further comprising creating a services portfolio if one does not exist.

4. The computer-implemented method according to claim 1 further comprising making any necessary changes to the plurality of SOA shared services to address the proposed change.

5. A system for managing a service oriented architecture (SOA) lifecycle organization change process comprising:
    at least one processing unit;
    memory operably associated with the at least one processing unit; and
    a change management tool storable in memory and executable by the at least one processing unit, the change management tool comprising:
        a retrieval component configured to retrieve a proposed organization-wide change;
        a lifecycle defining component to provide development, governance and management processes configured to define an SOA lifecycle based on the proposed change;
        a services portfolio component configured to:
            identify, when available, a reusable plurality of SOA shared services in services portfolio that addresses the proposed change; and
            search a services registry to identify at least one SOA shared service that addresses the proposed change;
        an affected stakeholder component configured to identify all affected stakeholders having a responsibility in the proposed change by identifying each of the following: each stakeholder having a responsibility in implementing the proposed change across the organization, each affected stakeholder having a responsibility in managing the proposed change across the organization, and each stakeholder having a responsibility in carrying out the proposed change across the organization;
an impact component configured to determine impacts of the proposed change on the affected stakeholders;
a deployment planning component configured to develop a service deployment plan and communication plan related to the proposed change; and
an implementation component configured to:
implement the plurality of SOA shared services, the service deployment plan, and the communication plan that addresses the proposed change; and
deploy the plurality of SOA shared services to implement the proposed change; and
a service management component configured to manage the proposed change after deployment of the plurality of SOA shared services by maintaining the deployed proposed change across the organization during a transition through a lifecycle for each of the deployed plurality of SOA shared services implementing the proposed change and as new SOA services are introduced after the proposed change is deployed.

6. The change management tool according to claim 5, the service management component further configured to develop a plurality of service management processes related to the plurality of SOA shared services and manage the plurality of SOA shared services throughout the lifecycle of the plurality of SOA shared services based on the plurality of service management processes.

7. The change management tool according to claim 5, the services portfolio component further configured to create a services portfolio if one does not exist.

8. The change management tool according to claim 5, the services portfolio component further configured to make any necessary changes to the plurality of SOA shared services to address the proposed change.

9. A computer program product storing computer instructions, which when executed, enables a computer system to identify a service oriented architecture (SOA) shared services project, comprising:
at least one computer readable tangible storage device;
program instructions, operatively coupled to the at least one computer readable tangible storage device, to retrieve a proposed organization-wide change;
program instructions, operatively coupled to the at least one computer readable tangible storage device, to defining an SOA lifecycle to provide development, governance and management processes based on the proposed change;
program instructions, operatively coupled to the at least one computer readable tangible storage device, to identify, when available, a reusable plurality of SOA shared services in a services portfolio that addresses the proposed change, the program instructions to identify further including program instructions to search a services registry to identify at least one SOA shared service that addresses the proposed change;
program instructions, operatively coupled to the at least one computer readable tangible storage device, to identify all affected stakeholders having a responsibility in the proposed change by identifying each of the following: each stakeholder having a responsibility in implementing the proposed change across the organization, each affected stakeholder having a responsibility in managing the proposed change across the organization, and each stakeholder having a responsibility in carrying out the proposed change across the organization;
program instructions, operatively coupled to the at least one computer readable tangible storage device, to determine impacts of the proposed change on the affected stakeholders;
program instructions, operatively coupled to the at least one computer readable tangible storage device, to develop a service deployment plan and communication plan related to the proposed change;
program instructions, operatively coupled to the at least one computer readable tangible storage device, to implement the plurality of SOA shared services, the service deployment plan, and the communication plan that addresses the proposed change; and
program instructions, operatively coupled to the at least one computer readable tangible storage device, to deploy the plurality of SOA shared services to implement the proposed change; and
program instructions, operatively coupled to the at least one computer readable tangible storage device, to manage the proposed change after deployment of the plurality of SOA shared services by maintaining the deployed proposed change across the organization during a transition through a lifecycle for each of the deployed plurality of SOA shared services implementing the proposed change and as new SOA services are introduced after the proposed change is deployed.

10. The computer program product according to claim 9 further comprising program instructions, operatively coupled to the at least one computer readable tangible storage device, to develop a plurality of service management processes related to the plurality of SOA shared services and manage the plurality of SOA shared services throughout the lifecycle of the plurality of SOA shared services based on the plurality of service management processes.

11. The computer program product according to claim 9, the program instructions for reviewing a services portfolio further comprising program instructions, operatively coupled to the at least one computer readable tangible storage device, to create a services portfolio if one does not exist.

12. The computer program product according to claim 9, the program instructions for reviewing a services portfolio further comprising program instructions, operatively coupled to the at least one computer readable tangible storage device, to make any necessary changes to the plurality of SOA shared services to address the proposed change.

13. A method for deploying a change management tool for use in a computer system that provides managing a service oriented architecture (SOA) lifecycle organization change process, comprising:
providing a computer processor operable to:
retrieve a proposed organization-wide change;
define an SOA lifecycle to provide development, governance and management processes based on the proposed change;
identify, when available, a reusable plurality of SOA shared services in services portfolio that addresses the proposed change;
access a services registry to identify at least one SOA shared service that addresses the proposed change;
identify all affected stakeholders having a responsibility in the proposed change by identifying each of the following: each stakeholder having a responsibility in implementing the proposed change across the organization, each affected stakeholder having a responsibility in managing the proposed change across the organization, and each stakeholder having a responsibility in carrying out the proposed change across the organization;

determine impacts of the proposed change on the affected stakeholders;

develop a service deployment plan and communication plan related to the proposed change;

implement the plurality of SOA shared services, the service deployment plan, and the communication plan that addresses the proposed change;

deploy the plurality of SOA shared services to implement the proposed change; and manage the proposed change after deployment of the plurality of SOA shared services by maintaining the deployed proposed change across the organization during a transition through a lifecycle for each of the deployed plurality of SOA shared services implementing the proposed change and as new SOA services are introduced after the proposed change is deployed.

14. The method according to claim 13, the computer infrastructure further operable to develop a plurality of service management processes related to the plurality of SOA shared services and manage the plurality of SOA shared services throughout the lifecycle of the plurality of SOA shared services based on the plurality of service management processes.

15. The method according to claim 13, the computer infrastructure further operable to create a services portfolio if one does not exist.

16. The method according to claim 13, the computer infrastructure further operable to make any necessary changes to the plurality of SOA shared services to address the proposed change.

* * * * *